United States Patent
Fukushima (10) Patent No.: US 7,380,023 B2
(45) Date of Patent: May 27, 2008

(54) VEHICULAR COMMUNICATION DEVICE EXCHANGING RECEPTION AND TRANSMISSION WITH EXTERNAL TOOL

(75) Inventor: Toshiyuki Fukushima, Kariya (JP)

(73) Assignee: Denso Corporation, Kariya, Aichi-pref. (JP)

(*) Notice: Subject to any disclaimer, the term of this patent is extended or adjusted under 35 U.S.C. 154(b) by 1175 days.

(21) Appl. No.: 10/374,137

(22) Filed: Feb. 27, 2003

(65) Prior Publication Data

US 2003/0200344 A1 Oct. 23, 2003

(30) Foreign Application Priority Data

Apr. 19, 2002 (JP) .............................. 2002-117956

(51) Int. Cl.
*G06F 15/16* (2006.01)
*G06F 7/00* (2006.01)
*G06F 5/00* (2006.01)

(52) U.S. Cl. ........................... 709/250; 701/29; 710/56

(58) Field of Classification Search .................. 701/29, 701/36; 710/52, 53, 56, 310; 714/25; 709/251
See application file for complete search history.

(56) References Cited

U.S. PATENT DOCUMENTS

| | | | | |
|---|---|---|---|---|
| 5,179,665 A | * | 1/1993 | Roslund et al. | ............. 709/215 |
| 5,765,187 A | * | 6/1998 | Shimizu et al. | ............. 711/110 |
| 6,112,267 A | * | 8/2000 | McCormack et al. | ......... 710/52 |
| 6,122,715 A | * | 9/2000 | Palanca et al. | ............. 711/154 |
| 6,128,560 A | * | 10/2000 | Ishii | ............................. 701/29 |
| 6,408,409 B1 | * | 6/2002 | Williams et al. | ............ 714/719 |

FOREIGN PATENT DOCUMENTS

| | | |
|---|---|---|
| JP | A-61-232747 | 10/1986 |
| JP | 10-91515 | 4/1998 |
| JP | A-10-207813 | 8/1998 |
| JP | A-2000-347833 | 12/2000 |
| JP | 2001-184191 | 7/2001 |
| JP | A-2001-298500 | 10/2001 |

OTHER PUBLICATIONS

Japanese Search Report (translation)—Oct. 2005.

* cited by examiner

*Primary Examiner*—William Vaughn
*Assistant Examiner*—Yemane Mesfin
(74) *Attorney, Agent, or Firm*—Nixon & Vanderhye P.C.

(57) ABSTRACT

An electronic control unit (ECU) and a tester are connected to exchange a CAN message through full duplex communication. A CAN communication control unit included in the ECU executes processings such as CAN message reception, response data generation, and CAN message transmission. A buffer management unit included in the ECU is equipped with a plurality of buffers that has uninterrupted ring address structure. The buffer stores reception and transmission data in common with a state sign. The state sign is attached by the CAN communication control unit to indicate a state currently executed in the buffer. The CAN communication control unit selects to use one of the buffers based on the state sign of the buffer when the reception of the request data or the transmission of the response data is executed.

8 Claims, 6 Drawing Sheets

VEHICULAR COMMUNICATION DEVICE EXCHANGING RECEPTION AND TRANSMISSION WITH EXTERNAL TOOL

CROSS REFERENCE TO RELATED APPLICATIONS

This application is based on and incorporates herein by reference Japanese Patent Application No. 2002-117956 filed on Apr. 19, 2002.

FIELD OF THE INVENTION

The present invention relates to a vehicular communication device especially handling a control area network (CAN) protocol with an external tool by using a ring buffer that has a state sign indicating a state executed in the ring buffer.

BACKGROUND OF THE INVENTION

Failure diagnosis is conducted by reading out information stored in an electronic control unit (ECU) through a control area network (CAN) protocol from a vehicular communication device with a tester. In communication with the tester, two temporary storage areas (buffer) for reception and transmission data are secured in the ECU.

The two buffers for reception and transmission each has a maximum memory size, so that, the buffers for the CAN protocol involves a memory size of total 8 k bytes (4 k bytes for each of reception and transmission).

Figure 8:
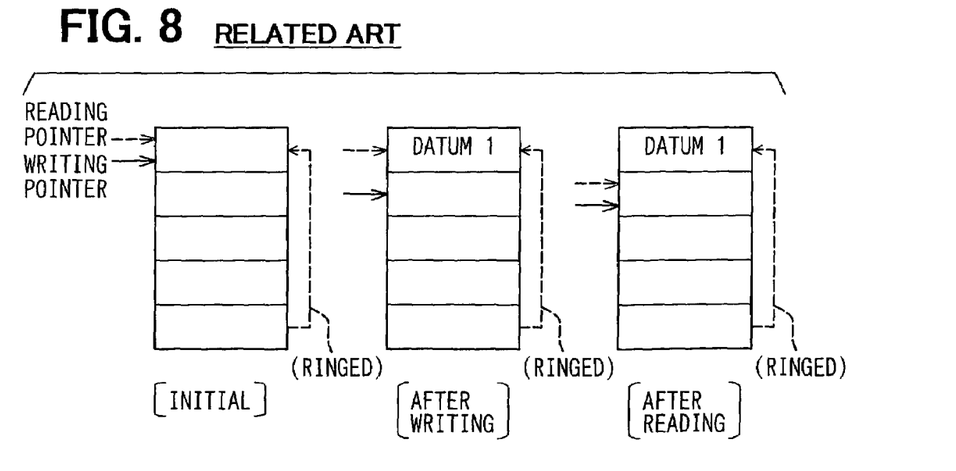
FIG. 8 is a schematic diagram explaining a ring buffer of a related art.

To save the buffers, a ring buffer is adopted for simultaneously storing the reception and the transmission data. Here, all areas of the ring buffer can be used for either reception or transmission data with setting up a writing pointer and a reading pointer for indicating an address for writing and reading, respectively. For instance, as shown in FIG. 8, after a datum 1 of one byte is written, the writing pointer advances by one byte. By contrast, after the byte of the datum 1 is read out, the reading pointer advances by one byte.

International Organization for Standardization (ISO) develops standards for the CAN protocol. For instance, in ISO 15765-2, full duplex communication simultaneously executing reception and transmission is specified in the CAN protocol. In the full duplex communication, the ring buffer cannot be simply used as explained above.

SUMMARY OF THE INVENTION

It is an object of the present invention to provide a vehicular communication device capable of efficiently executing at least one of reception of request and transmission of response with an external tool by using a plurality of buffers having ring structure.

To achieve the above object, a vehicular communication device is provided with the following. The vehicle communication device attaches each state sign of a plurality of state signs to each buffer based on a state for which each buffer is used. When the reception of the request or the transmission of the response is executed, the vehicle communication device selects and uses a given buffer based on a given state sign attached to the given buffer. This structure enables a buffer to store reception data and transmission data in common, so that memory areas of the buffer are effectively used.

It is preferable that the plurality of state signs include an idling sign, a receiving sign, and a transmitting sign. The idling sign indicates that each of the plurality of the buffers is used for no operation. The receiving sign indicates that each of the plurality of the buffers is used for the reception of the request. The transmitting sign indicates that each of the plurality of the buffers is used for the transmission of the response. This structure enables the state, for which the buffer is used, to be simply recognized, so that the buffer is accurately selected according to a communication state during the reception of the request and the transmission of the response.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
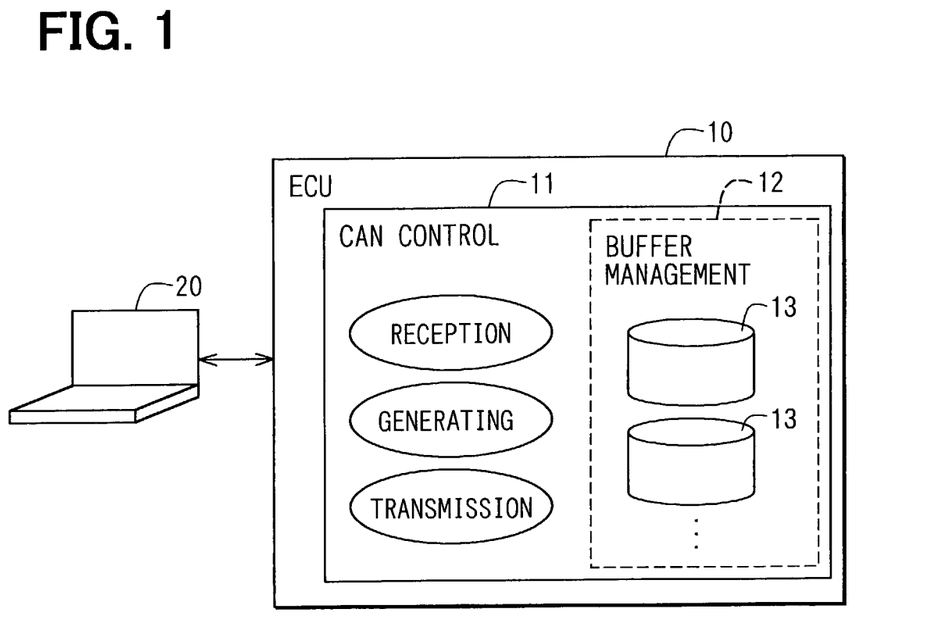
FIG. 1 is a schematic diagram of a vehicular control system according to an embodiment of the present invention.

Referring to FIG. 1, a vehicular communication device to which the present invention is applied will be explained below. An electronic control unit (ECU) 10 formed of a microcomputer executes an engine control, a transmission control, and others. The ECU 10 has a failure diagnosis function and stores the relevant diagnosis information in a non-volatile memory such as an EEPROM. The ECU 10 is connected with a tester 20 as an external tool, so that between them control area network (CAN) messages are exchanged through full duplex communication. The CAN communication is executed in compliance with, e.g., ISO 15765-2. As the tester 20 transmits to the ECU 10 a CAN request message (request datum) indicating reading out of the diagnosis information or engine information, the ECU 10 returns a CAN response message to the tester 20.

The ECU 10 includes a CAN communication control 11 for executing the CAN communication with the tester 20. The CAN communication control 11 is a module for controlling processing from receiving of the CAN request message from the tester 20 to transmitting of the CAN response message to the tester. The CAN communication control 11 is provided with processings such as CAN message reception, response datum generation, and CAN massage transmission.

The CAN message reception processing is for checking a format of the CAN request message (request datum) and storing the request datum in a buffer 13 to be explained later.

The response datum generation processing is for generating a response datum based on the request datum and storing the response datum to the buffer 13. The CAN message transmission processing is for obtaining the response datum from the buffer 13, converting the response datum into the CAN response message (CAN formatted response), and returning the CAN response message to the tester 20.

The CAN communication control 11 is equipped with a buffer management unit 12 including a plurality of buffers 13 that has ring buffer structure (uninterrupted ring address structure). The buffer 13 stores reception and transmission data in common with a predetermined state sign, in an area A1 of the FIG. 2, to indicate a state executed in the buffer 13. In specific, an "idling" sign indicates that no operation is executed in the buffer 13. A "receiving" sign indicates that reception is executed in the buffer 13, and a "transmitting" sign indicates transmission is executed in the buffer 13.

Figure 2:
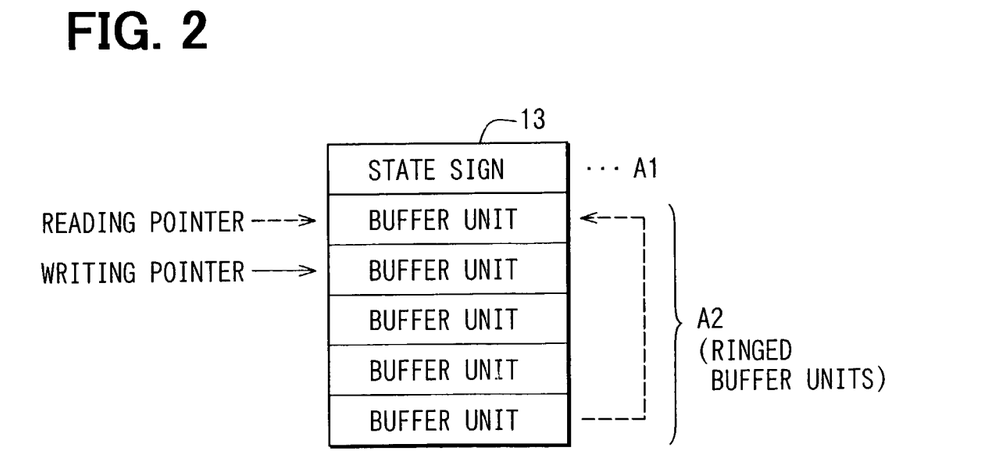
FIG. 2 is a structural diagram of a ring buffer according to the embodiment.

The buffer 13 also includes a plurality of areas A2 shown in FIG. 2 that are a plurality of buffer units where data are written. Writing into or reading out from the buffer unit is controlled by a writing pointer or a reading pointer, respectively. When data are written into the buffer units, the data are written (or stored) from the unit (or area) at which the writing pointer points at first and the writing pointer advances by units where the data are written. When data are read out from the buffer units, data are read out from the unit at which the reading pointer points at first and the reading pointer advances by units where the data are read out.

Figure 3A:
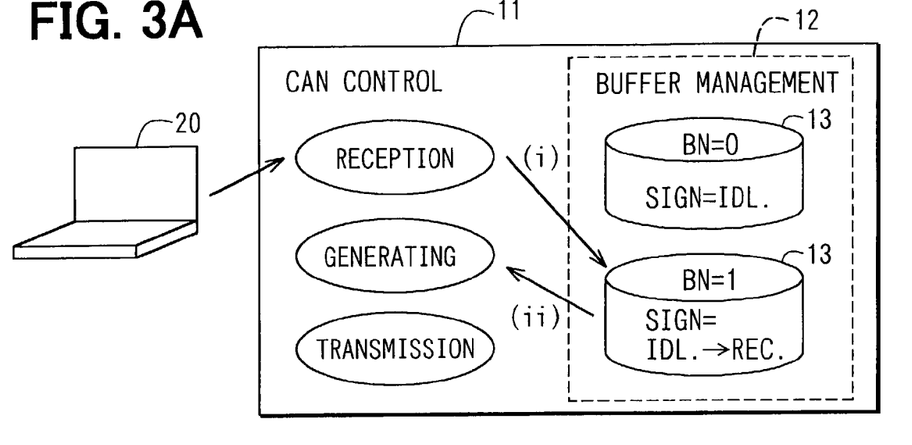
FIGS. 3A to 3C are schematic diagrams explaining communication sequence according to the embodiment.
Figure 3B:
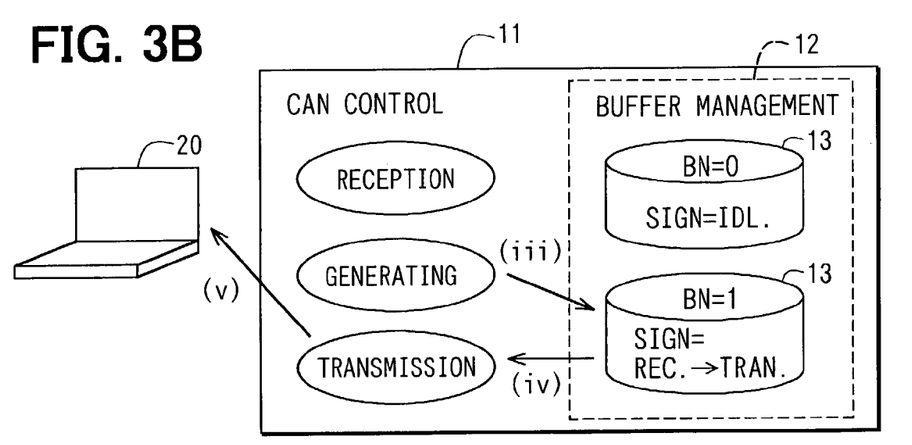
Figure 3C:
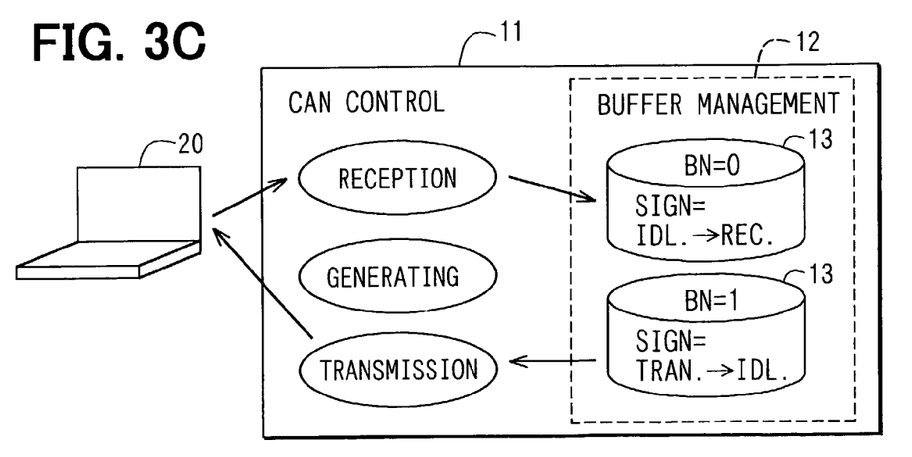

Referring to FIGS. 3A to 3C, an outline of the CAN communication control 11 will be explained below. Two buffers 13, having buffer number 0 and 1 (BN=0,1) are included in the buffer management unit 12.

As shown in FIG. 3A, as the CAN communication control 11 receives a request message from the tester 20, it searches for a buffer 13 having the "idling" sign to select it as a buffer 13 where a request datum in the request message is to be stored. Here, in the relevant buffer 13, i.e., BN=1 in FIG. 3A, the state sign is shifted from "idling" to "receiving." After the sign is changed to "receiving," the request datum is stored as shown in (i). The stored request datum is then obtained and a response datum corresponding to the request datum is generated as shown in (ii).

As shown in FIG. 3B, upon completion of generating the response datum, the state sign of the BN=1 buffer 13 is shifted from "receiving" into "transmitting." The generated response datum is then stored as shown in (iii) and afterward obtained, as shown in (iv). A response message based on the response datum is transmitted to the tester 20 as shown in (v).

As shown in FIG. 3C, when a new message is received during the "transmitting" sign of the BN=1 buffer 13, a new request datum is stored in the other BN=0 buffer 13 having the "idling" sign. Here, the state sign of the BN=0 buffer 13 is shifted into the "receiving." By contrast, the state sign of the BN=1 buffer 13 is returned from "transmitting" to "idling" upon completion of transmitting the message to the tester 20. Here, returning from "transmitting" to "idling" can be programmed to be set just after the stored response datum is obtained and before the response message is transmitted.

Referring to FIGS. 4 to 7, details of the CAN communication control unit 11, i.e., CAN message reception processing, response datum generation processing, and CAN message transmission processing, will be explained.

Figure 4:
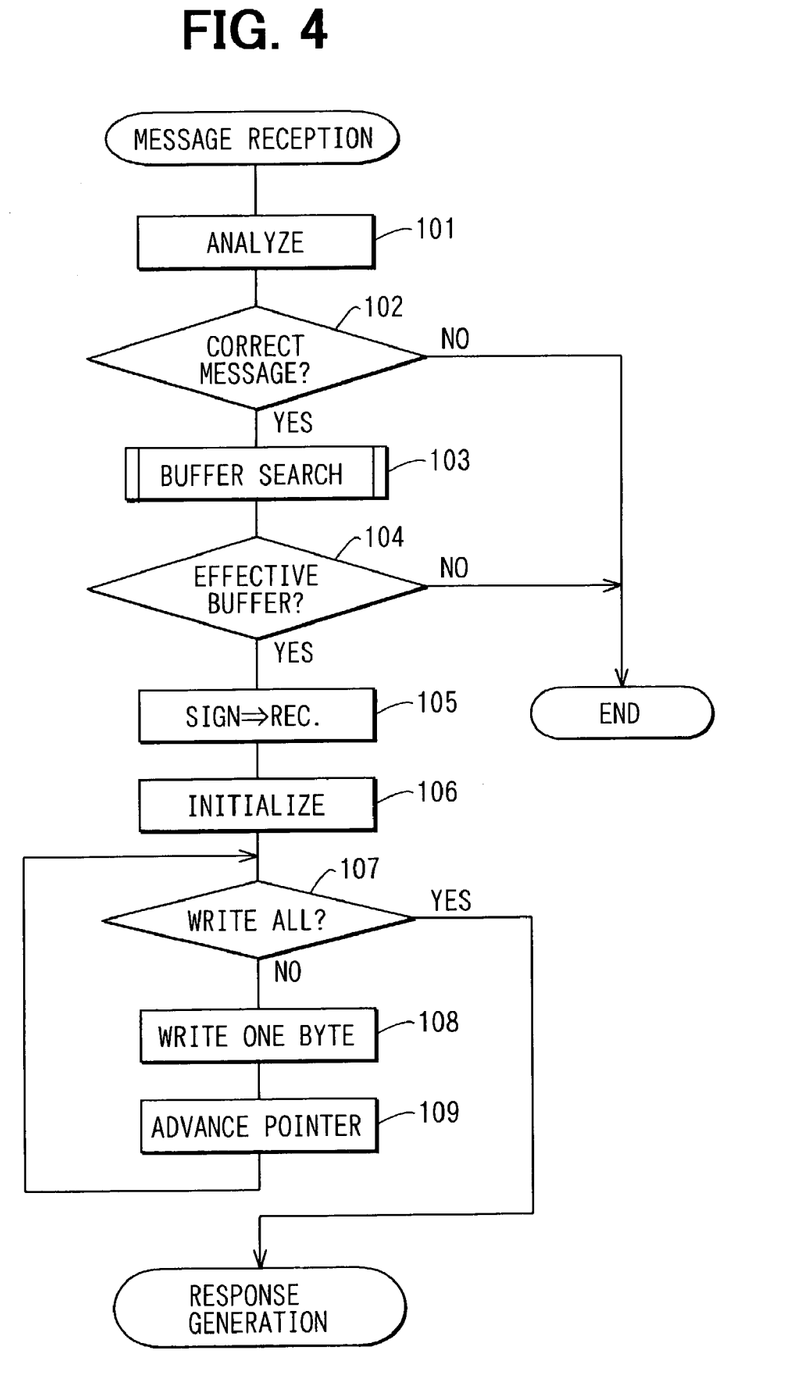
FIG. 4 is a flowchart diagram explaining processing of message reception according to the embodiment.

Referring to FIG. 4, at Step 101, when the CAN message is received from the tester 20, the CAN message reception processing is started to analyze content of the relevant message. At Step 102, whether the message is compliant with a format specified in a standard, e.g., ISO 15765-2, is determined. When the message is determined to be compliant with the format, the processing proceeds to Step 103.

Figure 7:
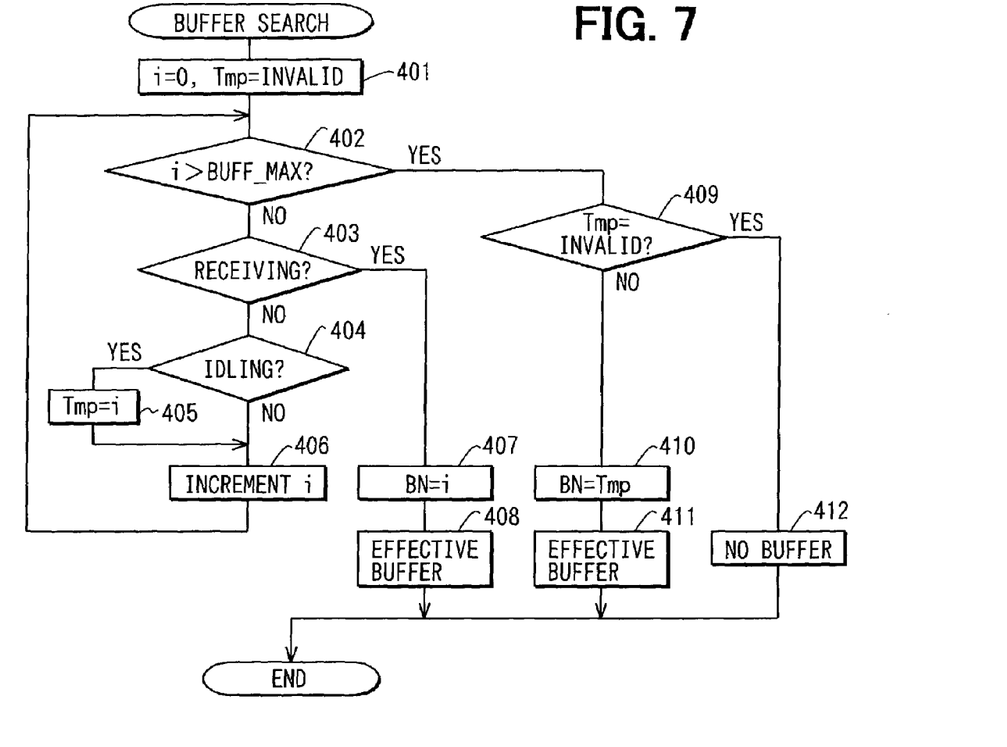
FIG. 7 is a flowchart diagram explaining processing of buffer search according to the embodiment.

At Step 103, the buffers 13 where the request datum is to be stored are searched in a subroutine of processing of buffer search shown in FIG. 7. In the buffer search processing, a returned value indicating "an effective buffer is present" or "an effective buffer is not present," is set depending upon whether an effective buffer 13 for the following processings is detected or not. In this embodiment, if all buffers 13 have "idling" signs, the maximum numbered buffer 13 is selected as the effective buffer. When a certain buffer 13 having the "receiving" sign is present, the certain buffer 13 is repeated to be selected in order to prevent simultaneous receiving processings. This is compliant with ISO 15765-2 and specified for giving priority to new reception over the preceding reception when the new reception occurs during the preceding reception.

Referring to FIG. 7, at Step 401, a work area i is set to 0 and a temporary value Tmp is set to an invalid value. At Step 402, whether i is more than a maximum value (BUFF_MAX) in the buffer number is determined. When i is determined to be not more than the maximum value, the processing proceeds to Step 403. At Step 403, whether the BN=i buffer 13 has the "receiving" sign is determined. At Step 404, whether the BN=i buffer 13 has the "idling" sign is determined. When the BN=i buffer 13 has neither "receiving" nor "idling" sign, the processing proceeds to Step 406. After i is incremented at Step 406, the processing returns to Step 402.

When the BN=i buffer 13 is determined to have the "idling" sign at Step 404, Tmp is set to i at Step 405 and i is incremented at Step 406. The processing then also returns to Step 402.

When the BN=i buffer 13 is determined to have the "receiving" sign at Step 403, current i is assigned to an effective buffer number (BN=i) at Step 407. The returned value indicating "an effective buffer is present" is then set at Step 408 to return to Step 104 in FIG. 4.

When i is determined to reach the maximum value of the buffer number (BUFF_MAX) at Step 402, whether Tmp is still invalid is determined at Step 409.

When a buffer 13 having the "idling" sign is detected during the processing at Steps 402 to 406, i is set to Tmp in each case and Tmp is therefore determined to be not invalid at Step 409. Current Tmp is thereby assigned to the effective buffer number (BN=Tmp) at Step 410. The returned value indicating "an effective buffer is present" is then set at Step 411 to return to Step 104 in FIG. 4.

By contrast, when the buffer 13 having the "idling" sign is not detected during the processing at Steps 402 to 406, Tmp remains in the invalid value and is therefore determined to be invalid at Step 409. Thereby at Step 412, the returned value indicating "an effective buffer is not present" is set at Step 412 to return to Step 104 in FIG. 4.

In the above buffer search processing in FIG. 7, the "idling" or "receiving" signed buffer 13 is selected to be the buffer 13 where the request datum is to be stored.

Returning to FIG. 4, at Step 104, whether the effective buffer 13 is present is determined by checking the returned value. When the effective buffer 13 is determined to be present, the processing proceeds to Step 105. At Step 105, the state sign of the relevant buffer 13 is shifted into or continues to be in "receiving." At Step 106, a writing and reading pointers are then initialized.

At Steps 107 to 109, all bytes of the request datum are stored in the relevant buffer 13. Every one byte writing advances the writing pointer by one byte at Steps 108, 109, which processing is repeated till all the bytes are written in the buffer 13. Upon completion of writing the request datum, the processing proceeds to the response datum generation processing.

Figure 5:
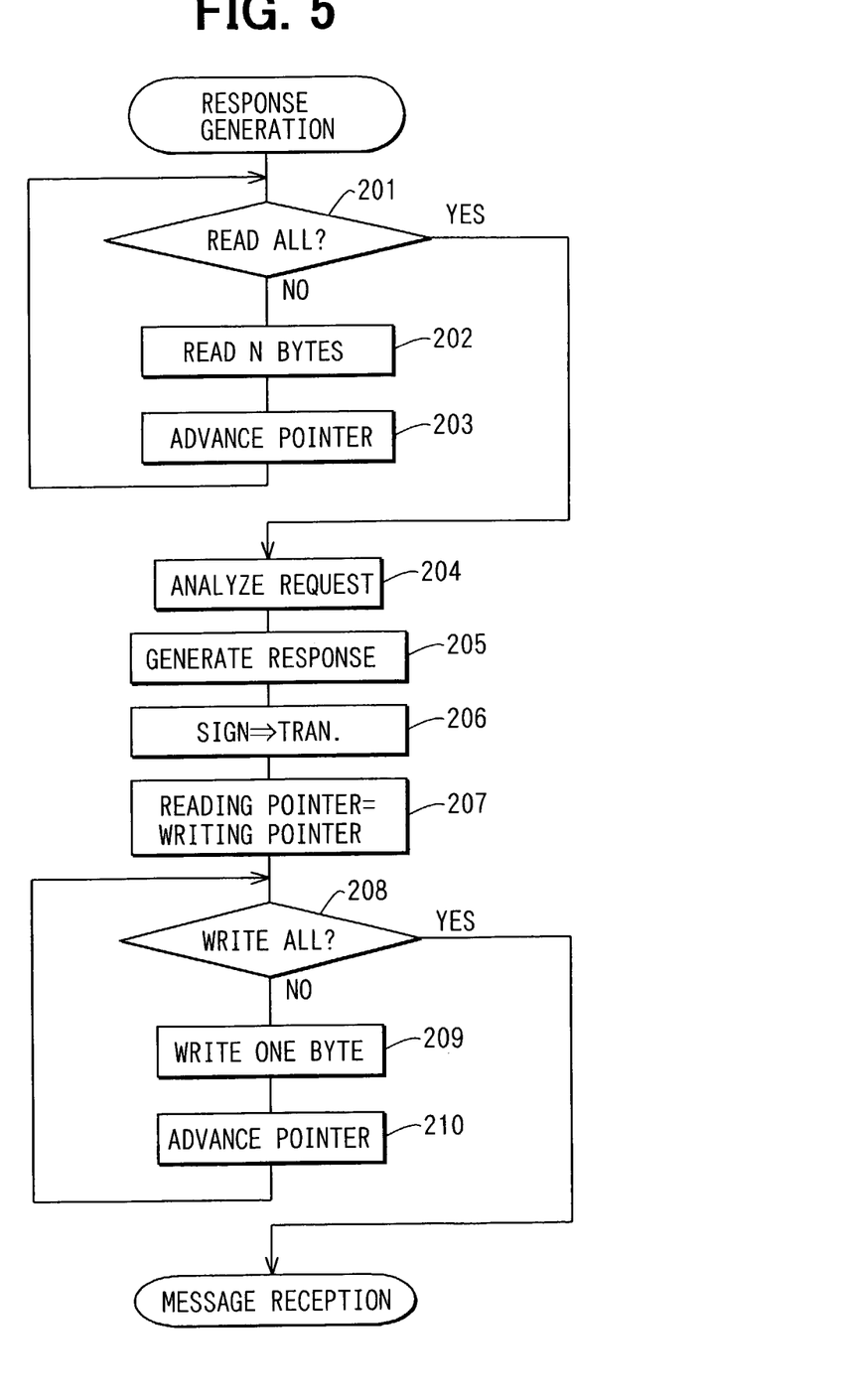
FIG. 5 is a flowchart diagram explaining processing of response generation according to the embodiment.

Referring to FIG. 5, at Steps 201 to 203 in the response datum generation processing, the request datum is obtained from the relevant buffer 13. Every N byte reading advances the reading pointer by N bytes at Steps 202, 203, which processing is repeated till all the bytes are read out from the relevant buffer 13. Upon completion of reading out the request datum, the processing proceeds to Step 204.

At Step 204, the request datum is analyzed to determine what information should be returned based on test mode information such as SID, PID, and others, all of which are compliant with ISO 15765, included in the request datum. At Step 205, data to be responded are collected and a response datum is generated according to the data.

At Step 206, the state sign is shifted to "transmitting." At Step 207, the current reading pointer is regarded as the writing pointer. At Steps 208 to 210, all bytes of the response datum are stored in the relevant buffer 13. Every one byte writing advances the writing pointer by one byte at Steps 209, 210, which processing is repeated till all the bytes are written in the buffer 13. Upon completion of writing the response datum, the processing proceeds to the CAN message transmission processing.

Figure 6:
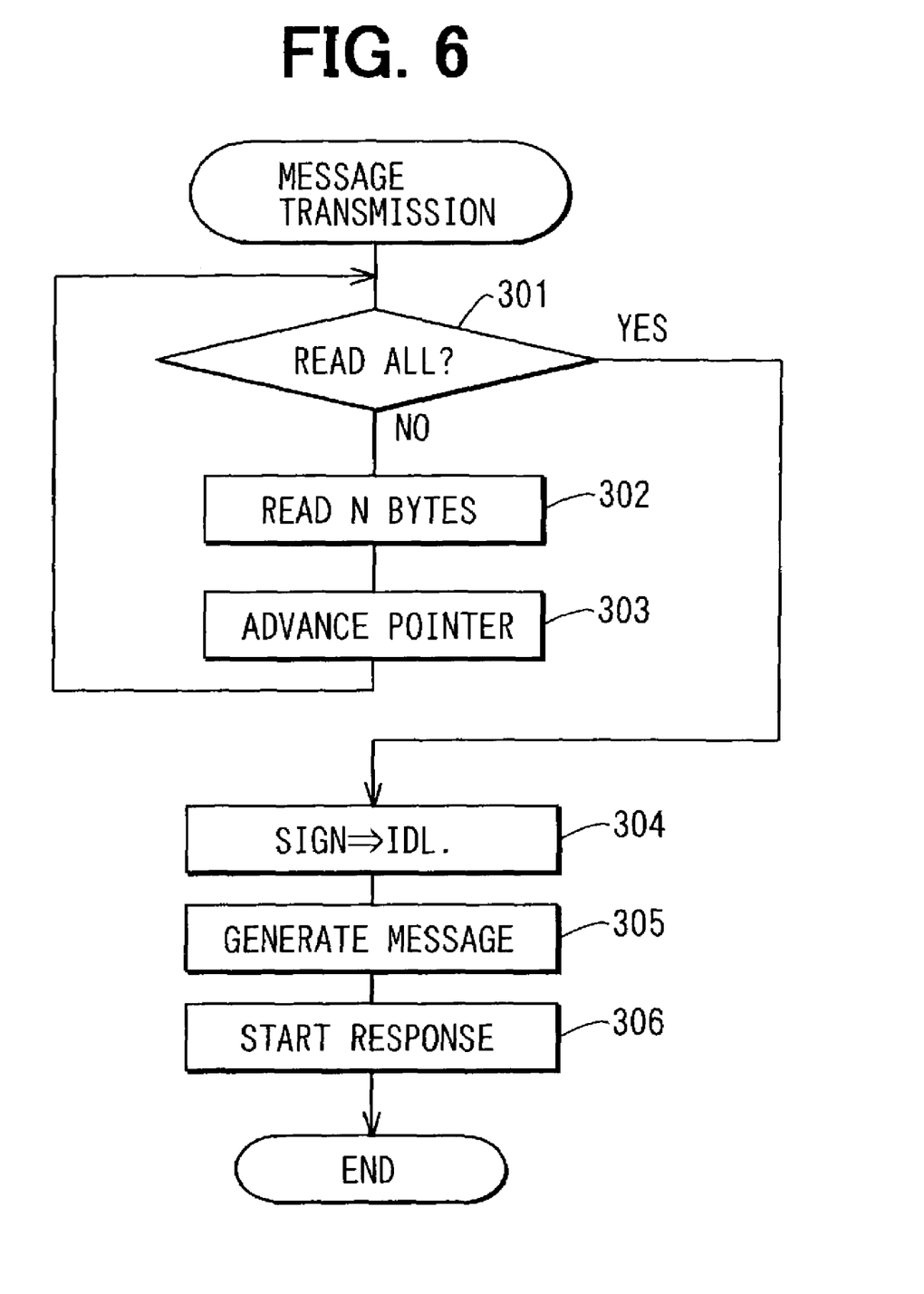
FIG. 6 is a flowchart diagram explaining processing of message transmission according to the embodiment.

Referring to FIG. 6, at Steps 301 to 303 in the CAN message transmission processing, the response datum is obtained from the relevant buffer 13. Every N byte reading advances the reading pointer by N bytes at Steps 302, 303, which processing is repeated till all the bytes are read out from the relevant buffer 13. Upon completion of reading out the response datum, the processing proceeds to Step 304.

At Step 304, the state sign is shifted into "idling." At Step 305, a CAN message is generated in a format compliant with ISO 15765-2. At Step 306, the response to the tester 20 is started.

The above embodiment provides the following effects. The buffer 13 having the ring buffer structure enables storing of reception and transmission in common, so that memory areas are effectively used. Each buffer 13 is selectively used based on its state sign which is properly shifted according to an operated state. By monitoring of the state sign of the buffer 13, which state is currently executed in the buffer 13 is clearly detected, so that a communication device is effectively and simply realized even with supporting the full duplex communication.

(Modification)

The above embodiment can be modified below.

Although the state signs include only "idling," "receiving," and "transmitting," other signs can be added. For instance, they can also include a state sign indicating that a response datum is being generated, or a state sign indicating that a buffer is in an abnormal state.

When the response datum written in the buffer 13 is read out, the response datum can be read out every portion from a plurality of portions divided from the response datum. Here, the state sign of the relevant buffer 13 should be shifted from the "transmitting" sign into the "idling" sign upon completion of reading out all portions of the response datum.

When rewriting program (so-called reprogramming) between the ECU 10 and the tester 20 is executed, the present invention can be applied to processing for exchanging data.

What is claimed is:

1. A vehicular communication device that executes, by using a plurality of buffers having ring buffer structure, at least one of reception of request and transmission of response with an external tool, the vehicular communication device comprising:

attaching means for attaching each of a plurality of state signs to each of the plurality of the buffers based on a varying state for which each of the plurality of the buffers is used; and selecting means for selecting and using, when at least one of the reception of the request and the transmission of the response is executed, a given buffer from the plurality of the buffers based on a given state sign of the plurality of the states, wherein the given state sign is attached to the given buffer by the attaching means;

wherein the plurality of the state signs include an idling sign indicating that each of the plurality of the buffers is used for no operation, a receiving sign indicating that each of the plurality of the buffers is used for the reception of the request, and a transmitting sign indicating that each of the plurality of the buffers is used for the transmission of the response;

wherein the selecting means, when the reception of the request from the external tool is executed, includes:

request writing means for selecting the given buffer, where the request is to be written, based on the given state sign, and then writing the request to the given buffer, wherein the attaching means attaches the receiving sign to the given buffer during a period from a time when the given buffer is selected to a time when the request starts to be written in the given buffer;

generating means for reading the request written in the given buffer and then generating the response;

response writing means for writing in the given buffer the response generated by the generating means, wherein the attaching means attaches the transmitting sign to the given buffer before the response starts to be written in the given buffer; and response transmitting means for reading, for transmitting, the response written in the given buffer, wherein the attaching means attaches the idling sign to the given buffer during a period from a time when the response is completely read to a time when the response is completely transmitted.

2. A vehicular communication device according claim 1, wherein the request writing means selects the given buffer to which the idling sign is attached and then writes the request to the given buffer.

3. A vehicular communication device according claim 1, wherein the request writing means selects the given buffer to which the receiving sign is attached and then writes the request to the given buffer.

4. A vehicular communication device according claim 1, wherein the response transmitting means reads, for transmitting, the response by dividing the response into a plurality of portions, and wherein the attaching means attaches the idling sign to the given buffer during a period from a time when all the portions of the response are completely read to a time when all the portions of the response are completely transmitted.

5. A method for effecting a vehicular communication using a plurality of buffers having ring buffer structure, at least one of reception of request and transmission of response with an external tool, the vehicular communication method comprising:

attaching each of a plurality of state signs to each of the plurality of the buffers based on a varying state for which each of the plurality of the buffers is used;

selecting and using, when at least one of the reception of the request and the transmission of the response is executed, a given buffer from the plurality of the buffers based on a given state sign of the plurality of the states, wherein the given state sign is attached to the given buffer by the attaching step;

wherein the plurality of the state signs include an idling sign indicating that each of the plurality of the buffers is used for no operation, a receiving sign indicating that each of the plurality of the buffers is used for the reception of the request, and a transmitting sign indicating that each of the plurality of the buffers is used for the transmission of the response;

when reception of the request from the external tool is executed, selecting the given buffer, where the request is to be written, based on the given state sign, and then writing the request to the given buffer, the receiving sign being attached to the given buffer during a period from a time when the given buffer is selected to a time when the request starts to be written in the given buffer;

reading the request written in the given buffer and then generating the response;

writing in the given buffer the generated response, wherein the transmitting sign is attached to the given buffer before the response starts to be written in the given buffer; and reading, for transmitting, the response written in the given buffer, wherein the idling sign is attached to the given buffer during a period from a time when the response is completely read to a time when the response is completely transmitted.

6. The method of claim 5 wherein the given buffer to which the idling sign is attached is selected and then the request is written to the given buffer.

7. The method of claim 5, wherein the given buffer to which the receiving sign is attached is selected and then the request to the given buffer is written.

8. The method of claim 5 wherein transmitting, the response is read by dividing the response into a plurality of portions, and wherein the idling sign is attached to the given buffer during a period from a time when all the portions of the response are completely read to a time when all the portions of the response are completely transmitted.

* * * * *